(12) United States Patent
Hoetzeldt

(10) Patent No.: US 8,951,623 B2
(45) Date of Patent: Feb. 10, 2015

(54) COMPOSITE PANEL

(75) Inventor: Stephan Hoetzeldt, Bremen (DE)

(73) Assignee: Airbus Operations GmbH (DE)

( * ) Notice: Subject to any disclaimer, the term of this patent is extended or adjusted under 35 U.S.C. 154(b) by 818 days.

(21) Appl. No.: 12/407,073

(22) Filed: Mar. 19, 2009

(65) Prior Publication Data

US 2009/0246502 A1    Oct. 1, 2009

Related U.S. Application Data

(60) Provisional application No. 61/072,328, filed on Mar. 28, 2008.

(30) Foreign Application Priority Data

Mar. 28, 2008  (DE) .......................... 10 2008 016 066

(51) Int. Cl.
   *B32B 3/12*     (2006.01)
   *E04B 1/82*    (2006.01)
   (Continued)

(52) U.S. Cl.
   CPC ............ *B64C 1/066* (2013.01); *B32B 2305/024* (2013.01); *B32B 3/12* (2013.01); *G10K 11/172* (2013.01); *B32B 2307/728* (2013.01); *B32B 5/26* (2013.01); *B32B 15/02* (2013.01)
   USPC ............. 428/116; 428/73; 428/117; 428/118; 428/219; 181/292; 244/123.13; 244/123.6

(58) Field of Classification Search
   CPC .............. B32B 15/02; B32B 2305/024; B32B 2307/728; B32B 37/146; B32B 3/00; B32B 3/12; B32B 3/20; B32B 5/26; B64C 1/40; B64C 1/066; B64C 2025/003; G10K 11/172; G10K 11/168; G10K 11/16; G10K 11/162

USPC .......... 428/116, 117, 118; 442/2, 10, 181, 59; 244/123.13, 123.6; 181/292
   See application file for complete search history.

(56) References Cited

U.S. PATENT DOCUMENTS 3,948,346 A  *   4/1976   Schindler ....................... 181/286
4,294,329 A  *  10/1981   Rose et al. ..................... 181/222
(Continued)

FOREIGN PATENT DOCUMENTS

DE   3034196   4/1981
DE   4336468   4/1995
(Continued)

OTHER PUBLICATIONS

Definition of Mesh, Textile Glossary, published by Celenese Acetate, copyright 2001.*

(Continued)

*Primary Examiner* — Jennifer A Steele
(74) *Attorney, Agent, or Firm* — Lerner, David, Littenberg, Krumholz & Mentlik, LLP

(57) ABSTRACT

The invention pertains to a composite panel with a first cover layer, a second cover layer and a first core layer that is arranged between the first cover layer and the second cover layer and features a plurality of cells that are separated from one another by walls at least in certain areas, wherein the first cover layer features a draining layer. The inventive composite panel may be distinguished from a composite panel according to the state of the art in that a second core layer with a plurality of cells that are separated from one another by walls at least in certain areas is arranged between the first cover layer and the first core layer.

22 Claims, 2 Drawing Sheets

(51) Int. Cl.
    *B64C 1/40*     (2006.01)
    *B64C 1/06*     (2006.01)
    *B32B 5/26*     (2006.01)
    *B32B 15/02*     (2006.01)
    *G10K 11/172*     (2006.01)

(56) References Cited

U.S. PATENT DOCUMENTS

| | | | |
|---|---|---|---|
| 4,318,453 A | 3/1982 | Rose et al. | |
| 4,390,584 A * | 6/1983 | Briens | 428/116 |
| 5,041,323 A | 8/1991 | Rose et al. | |
| 5,472,760 A * | 12/1995 | Norvell | 428/71 |
| 5,543,198 A * | 8/1996 | Wilson | 428/116 |
| 2007/0235253 A1* | 10/2007 | Hiraku et al. | 181/293 |
| 2008/0135329 A1* | 6/2008 | Strunk et al. | 181/214 |

FOREIGN PATENT DOCUMENTS

| | | |
|---|---|---|
| DE | 69108710 T2 | 11/1995 |
| DE | 102006023294 | 11/2007 |
| WO | 2007135085 | 11/2007 |

OTHER PUBLICATIONS

Hexcel, Product Data, Leno Weave.

* cited by examiner ial/substance/semi-finished product (in the following description, the terms "substance" or "material" also refer to a "semi-finished product") for use in an aircraft, it is common practice to carry out impact stress tests, in which test bodies of predefined dimensions are dropped on a material to be tested, for example, from predefined heights. In addition to high velocity impact tests, there also exist low velocity impact tests (also referred to as "low velocity impact tests" exerting an impact energy of 2 joule or more) that make it possible to assess if a material may be used, for example, in special areas of the interior of an aircraft cargo hold. The problem with the above-described composite panel with cover layers of lightweight glass fiber/carbon fiber prepregs may be seen in that they would not withstand a low velocity impact test with impact energy of 2 joule more. The energy that may be absorbed by a thusly structured material is so low that the composite panel would simply be destroyed during such a low velocity impact test and at least feature an unacceptable hole at the point of impact.

COMPOSITE PANEL

CROSS-REFERENCE TO RELATED APPLICATIONS

This application claims the benefit of the filing date of U.S. Provisional Patent Application No. 61/072,328 filed Mar. 28, 2008, the disclosure of which is hereby incorporated herein by reference.

The invention relates to a composite panel with a first cover layer, a second cover layer and a first core layer that is arranged between the first cover layer and the second cover layer and features a plurality of cells that are separated from one another by walls at least in certain areas.

BACKGROUND OF THE INVENTION

The lining of aircraft interiors primarily consists of sandwich structures with a honeycomb core, for example, of a resin-impregnated aramid fiber material and cover layers of glass fiber prepreg and/or carbon fiber prepreg. In order to provide a certain sound insulation, it is advisable to realize these sandwich structures such that they are not completely closed, but rather also allow sufficient gas permeability. This means that fluids such as, for example, condensation water also penetrate into the cells or honeycombs of the core layer. However, penetrating water could lead to corrosion or rotting of the materials of the composite panel.

DE 10 2006 023294 A1 introduces a composite panel that is designed for sound insulation purposes and simultaneously allows sufficient drainage such that rotting phenomena do not occur. To this end, a composite panel is proposed that features two cover layers and a core layer arranged in between, wherein the first cover layer features a draining layer and the cells of the core layer are at least partially covered by the draining layer.

In order to evaluate the impact resistance of a material/substance/semi-finished product (in the following description, the terms "substance" or "material" also refer to a "semi-finished product") for use in an aircraft, it is common practice to carry out impact stress tests, in which test bodies of predefined dimensions are dropped on a material to be tested, for example, from predefined heights. In addition to high velocity impact tests, there also exist low velocity impact tests (also referred to as "low velocity impact tests" exerting an impact energy of 2 joule or more) that make it possible to assess if a material may be used, for example, in special areas of the interior of an aircraft cargo hold. The problem with the above-described composite panel with cover layers of lightweight glass fiber/carbon fiber prepregs may be seen in that they would not withstand a low velocity impact test with impact energy of 2 joule more. The energy that may be absorbed by a thusly structured material is so low that the composite panel would simply be destroyed during such a low velocity impact test and at least feature an unacceptable hole at the point of impact.

Furthermore, lining parts ready to be installed in an aircraft should have a specific weight of no more than about 950-1150 g/m$^2$, wherein this value represents the state of the art with respect to closed lining panels. Currently, the specific weight of the lightest, sufficiently gas-permeable lining panels in the form of lining parts ready to be installed in an aircraft that withstand a low velocity impact test with impact energy of 2 joule or more and consist of glass fiber-reinforced and/or carbon fiber-reinforced plastic lies at approximately 1400 g/m$^2$ without a textile layer applied thereon. However, this is unacceptable.

It was furthermore determined during the investigation of the above-described composite panels that no sufficient drainage is achieved in a horizontal installation position. Consequently, it may be expected that water absorption due to cleaning and condensation effects will result in at least 40 percent by volume of the core material remaining filled with water until it is evaporated or released due to strong vibrations as they occur, for examples during the start of the aircraft.

SUMMARY OF THE INVENTION

The invention therefore is based on the objective of proposing a composite panel that has at least the same mechanical, sound-absorbing and drainage properties as a conventional composite panel, but may withstand a low velocity impact test with impact energy of at least 2 joule. In addition, the same shielding effect against electromagnetic interferences (EMI) and the same heat-related material properties such as heat release, smoke development and toxicity (also referred to as "FST" for Fire, Smoke, Toxicity) should also be preserved.

In a composite panel with the characteristics of the preamble of claim 1, this objective is attained with the characteristics of the characterizing portion of claim 1.

The invention proposes a composite panel with a first cover layer, a second cover layer and a first core layer that is arranged between the first cover layer and the second cover layer and features a plurality of cells that are separated from one another by walls at least in certain areas, wherein a second core layer with a plurality of cells that are separated from one another by walls at least in certain areas is arranged on the first cover layer and the first core layer, and wherein the upper side of this second core layer features/covers at least one draining layer. In the inventive composite panel, the different requirements with respect to the mechanical properties are distributed over different layers. The first core layer that essentially corresponds to the core layer of the composite panel according to the state of the art ensures the required mechanical rigidity and is manufactured, for example, of an open, pre-impregnated semi-finished fiber product in connection with a conventional honeycomb core. The material preferably consists of aramid fibers that are impregnated with phenol resin, particularly meta-aramid, a semi-finished product of which is also known under the name "Nomex® paper." Another core layer with a thickness, for example, of 4-5 mm is preferably also manufactured in the form of a honeycomb core of the same material. The cell width of this second core layer lies, for example, between 4.8 mm and 6.4 mm. It is able to absorb impact stresses with a low velocity without damaging the first core layer that primarily contributes to the mechanical rigidity of the composite panel.

In another embodiment, the first core layer preferably features slots that significantly improve the drainage capability of the composite panel on its rear side, i.e., in the direction of an adjacently arranged insulating assembly. Core layers of this type are known as "Slotted Honeycombs." In addition, ventilation holes are preferably arranged in the composite panel and allow an air flow from the front side of the composite panel into the slots of the slotted rear side such that a significantly improved drainage effect may be achieved.

The cell width of the second core layer is chosen such that it does not negatively influence the drainage effect of the draining layer on the upper side of the second core layer, but is still transparent to sound.

Other advantageous embodiments are disclosed in the dependent claims.

BRIEF DESCRIPTION OF THE DRAWINGS

The invention is described in greater detail below with reference to drawings. In the drawings, identical objects are identified by the same reference symbols. In these drawings.

DETAILED DESCRIPTION

Figure 1:
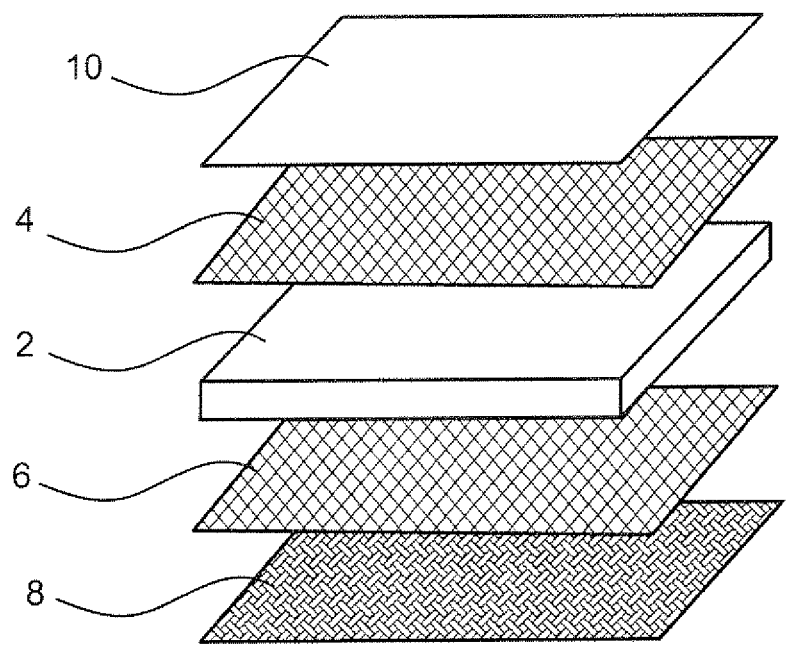
FIG. 1 shows a schematic structure of a composite panel according to the state of the art.

FIG. 1 schematically shows the structure of a composite panel according to the state of the art. This figure shows a honeycomb core 2 that is manufactured, e.g., of ABS 5035 and has a thickness, for example, of approximately 15 mm. Layers 4 and 6 of an open-weave, pre-impregnated and preferably heavy glass fiber fabric/carbon fiber fabric (also referred to as "open weave prepreg") are respectively situated on the upper side and the underside of the aforementioned honeycomb core and form a so-called sandwich structure together with the honeycomb core 2. This sandwich structure has a relatively high mechanical rigidity and not only makes it possible to realize a sound insulation, but also a permeability to fluids and air due to the open-weave structure of the glass fiber/carbon fiber layers 4 and 6, as well as due to the permeable cells of the honeycomb core 2, such that a certain drainage capacity is achieved. Toward the bottom, the composite panel according to the state of the art is closed with a bronze fabric layer 8 that serves as a shield against electromagnetic interferences. The upper side of the composite panel according to the state of the art is closed with a textile layer 10 that preferably consists of flame-retardant polyester fibers. The composite panel is installed in the aircraft fuselage in such a way that the textile layer 10 is arranged on the visible side and the bronze fabric layer 8 flatly adjoins insulation assemblies or foils.

The structure illustrated in FIG. 1 may be modified to the effect that the honeycomb core 2 is manufactured of aramid fibers that are impregnated with phenol reason (for example, in the form of Nomex® paper), wherein preferably lightweight open-weave carbon fiber prepregs 4 and 6 are arranged on both sides of this honeycomb core. The bronze fabric layer 8 and the textile layer 10 remain unchanged. Although both embodiments of the composite panel according to the state of the art have a drainage capability that suffices for 90 and 45° positions, as well as a low specific weight of approximately 1000 g/m² and a very high mechanical rigidity for this specific weight, composite panels manufactured in this fashion are very sensitive to impact stresses. Composite panels according to the state of the art cannot withstand low velocity impact tests with impact energy of 2 joule without damages.

Figure 2:
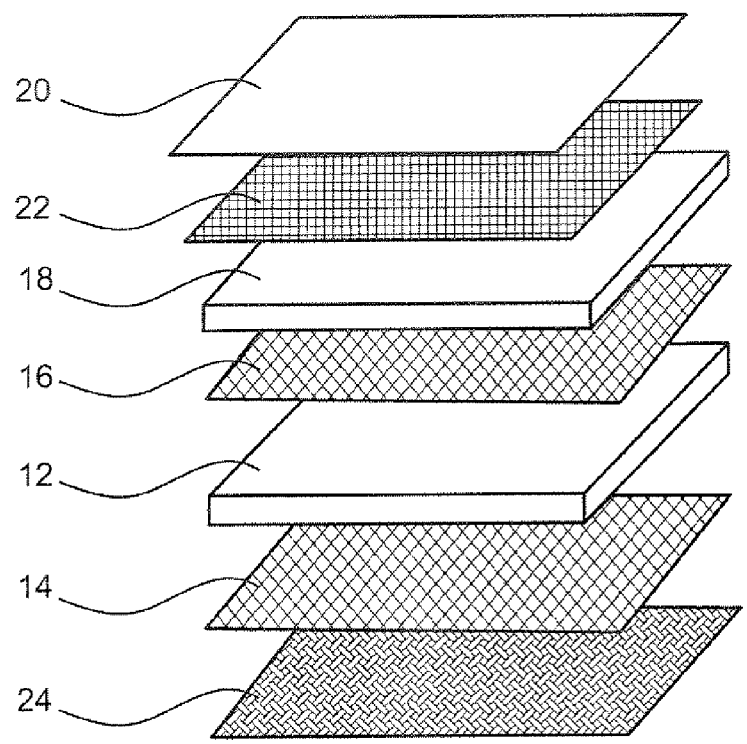
FIG. 2 shows a schematic structure of an Inventive composite panel for 90° and 45° installation positions.

The inventive structure of a composite panel according to FIG. 2, however, is able to provide a sufficient resistance to this type of impact stresses. Similar to the illustration in FIG. 1, the inventive composite panel features a first honeycomb core 12 that has a thickness just under 10 mm and preferably consists of aramid fibers that are impregnated with phenol resin. The first honeycomb core 12 is closed with two layers 14 and 16 of an open-weave carbon fiber prepreg that have a weight of at least 240 g/m² in order to ensure the stability of the otherwise dimensionally unstable honeycomb core 12. A second honeycomb core 18 that may also consist of aramid fibers impregnated with phenol resin is arranged above the upper carbon fiber layer 16. The first honeycomb core 12 preferably has a cell width of approximately 4.8 mm while the cell width of the second honeycomb core 18 lies between 4.8 and 6.4 mm. This second honeycomb core 18 serves for absorbing impact stresses and therefore is also referred to as "Impact-Layer" The thickness preferably lies just under 5 mm and the specific weight in this configuration amounts, for example, to 32 kg/m² analogous to the first honeycomb core layer 12. The upper side of the composite panel material is covered with a textile layer 20 that may, for examples consist of fire-retardant polyester fibers analogous to the state of the art. Another very light open-weave (e.g., glass fiber) layer 22 (also known as "Leno Weave Prepreg") may be optionally arranged between the second honeycomb core layer 18 and the textile layer 20 in order to achieve an improved optical appearance of the panel surface. The textile layer 20 or the combination of the textile layer 20 and the fiber layer 22 may also be referred to as front side cover layer or first cover layer, respectively. Another layer 24 that may be realized in the form of a bronze fabric layer in order to shield against electromagnetic interferences is situated underneath the open-weave carbon fiber prepreg layer 14.

The second honeycomb core layer 18 does not negatively influence the drainage effect of the textile layer 20 and is furthermore transparent to sound. It is able to absorb impact stresses and to keep these impact stresses away from the first honeycomb core layer 12 and the upper carbon fiber layer 16 such that the mechanical rigidity of an inventive composite panel may be ensured.

The manufacture of an inventive composite panel could be realized, for example, in two production steps, wherein the first production step comprises the "baking" of the open-weave carbon fiber prepreg layers 16 and 14 on the first honeycomb core layer 12 in an autoclave, and wherein the second honeycomb core layer 18 is also solidly bonded during this first production step by means of the resin of the open-weave carbon fiber layers 16. Furthermore, the bronze fiber layer 24 is also bonded to the composite panel in the first production step. Subsequently, the textile fiber layer 20 is bonded to the composite panel by means of a hot-melt adhesive in a second production step. The inventive composite panel is preferably installed such that the side of the composite panel that features the bronze layer 24 evenly adjoins insulation assemblies or foils while the side featuring the textile layer 20 faces the interior of the aircraft. For example, the total thickness of the inventive composite panel amounts to approximately 15 mm at a specific weight of at least 1000 g/m² without another very light open-weave fiber layer 22, wherein an inventive composite panel with such a very light open-weave fiber layer 22 could approximately have a specific weight of just under 1100 g/m².

Figure 3:
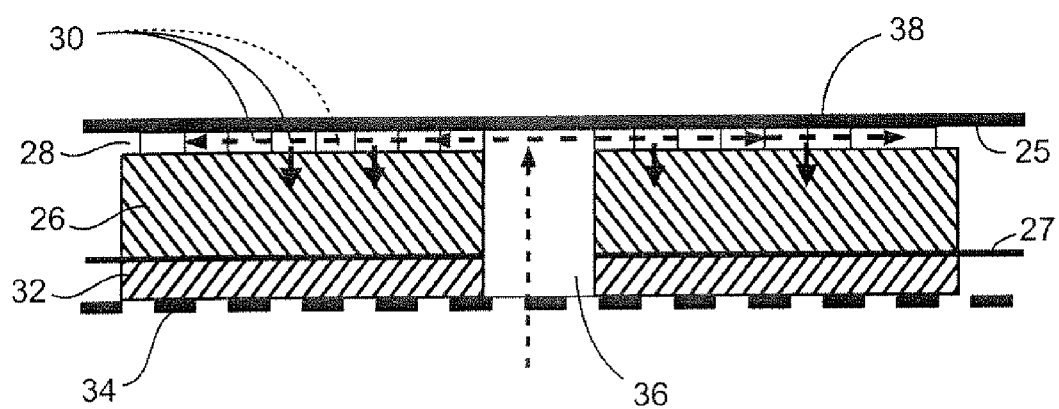
FIG. 3 shows a cross section through an inventive composite panel for 0° installation positions.

The inventive composite panel may be additionally modified to the effect that it not only has a very good drainage effect for 90° or 45° installation positions, but also for 0° installation positions, i.e., horizontal installation positions. FIG. 3 shows the schematic structure of such a composite panel. The inventive composite panel according to this second embodiment also features a first honeycomb core layer 26 that, however, is provided with a plurality of slots 30 on its upper side 28 such that an air circulation may be achieved not only in the longitudinal direction of the honeycomb core cells, but also perpendicular thereto on the upper side 28 of the first honeycomb core layer 26. This material is also known under the name "Slotted Honeycomb." A second honeycomb core layer 32 is situated underneath the first honeycomb core layer 26 and baked or bonded on the first honeycomb core layer 26, preferably by means of an open-weave glass fiber or carbon fiber layer 27 situated in between. A textile layer 34 arranged underneath the second honeycomb core layer 32 forms the bottom end of the inventive composite panel. In this case, the first and the second honeycomb core layer 26 and 32 preferably also consist of aramid fibers that are impregnated with phenol resin, wherein the cell width may be as large as 6.4 mm. The first honeycomb core layer 26 is preferably closed with two layers 25 and 27 of an open-weave carbon fiber prepreg that has a weight of at least 240 g/m$^2$ in order to ensure the stability of the otherwise dimensionally unstable honeycomb core.

Water is situated at least within the first honeycomb core layer 26 of the second embodiment due to condensation and cleaning. The drainage effect is caused by the natural tendency of the water in this first honeycomb core layer 26 to drain through the second honeycomb core layer 32 on the flanks of the large-cell honeycomb core under the influence of the gravitational force in order to subsequently reach the textile layer 34. For this purpose, the first and the second honeycomb core layer 26 and 32 need to have a cell width of at least 4.8 mm. In this case, the flanks of the cells form a rupture line of sorts for the surface tension of the water, wherein this inevitably leads to an imbalance between the gravitational force and the surface tension of the water on the boundary surface of the first honeycomb core layer 12 such that the gravitational force causes the water to drain. In order to allow or simplify the admission of air into the cells of the first honeycomb core layer 26, ventilation holes 36 are provided within the inventive composite panel, wherein these ventilation holes have a diameter of at least 10 mm and are distributed over the entire surface of the composite panel, for example, in an arrangement of one ventilation hole per m$^2$ of the composite panel or more. The ventilation holes 36 extend through the entire thickness of the inventive composite panel. This is necessary because the insulation assemblies 38 or foils that are respectively situated adjacent to the first fiber layer 25 or the honeycomb core layer 26 flatly lie on the fiber layer or the first honeycomb core layer 26 and would impede a simple pressure compensation. Without this pressure compensation, hardly any water could drain because a negative pressure would build up within the composite panel and immediately compensate the reduced surface tension of the water again. According to the invention, the air flowing through the ventilation holes 36 is laterally distributed into the first honeycomb core layer 26 through the slots 30.

The advantage of this ventilation method may be seen in that completely closed insulation foils or assemblies without ventilation holes may be used that otherwise would significantly reduce or entirely destroy the water tightness on the rear side. The manufacture of the inventive composite panel according to the embodiment illustrated in FIG. 3 is also realized by means of "baking" analogous to the first embodiment according to FIG. 2.

Water seeping through the composite panel reaches the textile layer 34 and may then drip into the aircraft interior. The rear side of the inventive composite panel according to the second embodiment also features a bronze fabric layer that is not illustrated in FIG. 3 and ensures the required shielding against electromagnetic interferences. This makes it possible to manufacture an inventive composite panel that has a total thickness of approximately 15 mm and a specific weight of 1200 g/m$^2$ if another very light open-weave fiber layer is used, wherein an inventive composite panel without this very light open-weave fiber layer has a specific weight of approximately 1140 g/m$^2$.

The advantages of the invention may be seen, in particular, in that an extremely light and flat composite panel for lining an aircraft interior is proposed that, in addition to excellent drainage properties, has a very low specific weight and is able to withstand low velocity impact stresses. Particularly in 0° installation positions, i.e., if an inventive composite panel is arranged horizontally, the previously existing drainage problem is solved without requiring foil openings or uneven areas on a lining part with frayed textiles.

The invention claimed is:

1. An aircraft lining element having a composite panel comprising:
    a first cover layer;
    a second cover layer;
    a first core layer arranged between the first cover layer and the second cover layer and comprising a plurality of cells at least partially separated from one another by walls, wherein the first core layer provides the mechanical rigidity by means of a suitable cell width and a suitable thickness thereof required for use as a vehicle cabin lining and provides sound insulation; and
    a second core layer comprising a plurality of cells separated from one another by walls having a suitable cell width and suitable thickness for absorbing low velocity impact stresses with an impact energy of at least 2J, the second core layer being arranged between the first cover layer and the first core layer, wherein the second core layer is transparent to sound,
    wherein the first cover layer comprises a draining layer, and
    wherein the specific weight of the composite panel is in the range of about 1000 g/m$^2$ to about 1100 g/m$^2$.

2. The aircraft lining element of claim 1, wherein the first cover layer further comprises an open-weave fiber layer.

3. The aircraft lining element of claim 2, wherein the fiber layer is a pre-impregnated semi-finished fiber product.

4. The aircraft lining element of claim 1, further comprising a fluid-permeable intermediate layer arranged between the first core layer and the second core layer.

5. The aircraft lining element of claim 1, further comprising an electrically conductive layer on an outer surface.

6. The aircraft lining element of claim 5, wherein the electrically conductive layer is a bronze fabric.

7. The aircraft lining element of claim 1, further comprising a fluid-permeable textile layer on an upper side of the second core layer.

8. The aircraft lining element of claim 7, wherein the textile layer is hydrophilic.

9. The aircraft lining element of claim 1, wherein the first core layer features lateral slots in the walls on its side that points away from the second core layer.

10. The aircraft lining element of claim 9, further comprising ventilation holes that extend through the entire thickness of the composite panel.

11. An aircraft lining panel having a composite panel comprising:
    a first cover layer;
    a second cover layer;
    a first core layer arranged between the first cover layer and the second cover layer and comprising a plurality of cells at least partially separated from one another by walls, wherein the first core layer completely provides the mechanical rigidity required for use of the aircraft lining panel as a vehicle cabin lining and provides sound insulation;

a second core layer for absorbing low velocity impact stresses with an impact energy of at least 2J, the second core layer comprising a plurality of cells separated from one another by walls and is arranged between the first cover layer and the first core layer, wherein the cell width of the cells of the second core layer is adapted to allow drainage effect of the first core layer; and a plurality of ventilation holes extending through the entire thickness of the composite panel, wherein the first cover layer comprises a draining layer, and wherein the specific weight of the composite panel is in the range of about 1000 $g/m^2$ to about 1100 $g/m^2$, or wherein the specific weight of the composite panel is in the range of about 1140 $g/m^2$ to about 1200 $g/m^2$.

12. The aircraft lining panel of claim 11, wherein the first cover layer further comprises an open-weave fiber layer.

13. The aircraft lining panel of claim 12, wherein the fiber layer is a pre-impregnated semi-finished fiber product.

14. The aircraft lining panel of claim 11, further comprising a fluid-permeable intermediate layer arranged between the first core layer and the second core layer.

15. The aircraft lining panel of claim 11, further comprising an electrically conductive layer on an outer surface.

16. The aircraft lining panel of claim 11, further comprising a fluid-permeable textile layer on an upper side of the second core layer.

17. The aircraft lining panel of claim 16, wherein the textile layer is hydrophilic.

18. The aircraft lining panel of claim 11, wherein the first core layer features lateral slots in the walls on its side that point away from the second core layer.

19. The aircraft lining element of claim 1, wherein the first core layer has a first thickness and the second core layer has a second thickness, wherein the second thickness is smaller than the first thickness.

20. The aircraft lining element of claim 19, wherein the first thickness is approximately 10 mm or less and the second thickness is between 4 mm and 5 mm.

21. The aircraft lining element of claim 1, wherein the cells of the first core has a first cell width and the cells of the second core has a second cell width, wherein the second cell width is equal to or greater than the first cell width.

22. An aircraft lining element having a composite panel comprising:

a first cover layer;

a second cover layer;

a first core layer arranged between the first cover layer and the second cover layer and comprising a plurality of cells at least partially separated from one another by walls, wherein the first core layer provides the mechanical rigidity by means of a suitable cell width and a suitable thickness thereof required for use as a vehicle cabin lining and provides sound insulation; and a second core layer comprising a plurality of cells separated from one another by walls having a suitable cell width and suitable thickness for absorbing low velocity impact stresses with an impact energy of at least 2J, the second core layer being arranged between the first cover layer and the first core layer, wherein the second core layer is transparent to sound, wherein the first cover layer comprises a draining layer, and wherein the specific weight of the composite panel is in the range of about 1140 $g/m^2$ to about 1200 $g/m^2$.

* * * * *